(12) United States Patent
Gronwald

(10) Patent No.: US 8,830,643 B2
(45) Date of Patent: Sep. 9, 2014

(54) POLARITY REVERSAL PROTECTION UNIT FOR VEHICLE ELECTRIC SYSTEMS OF MOTOR VEHICLES

(75) Inventor: Frank Gronwald, Bedburg (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 1247 days.

(21) Appl. No.: 12/668,836

(22) PCT Filed: Oct. 19, 2007

(86) PCT No.: PCT/EP2007/061201
§ 371 (c)(1),
(2), (4) Date: Feb. 5, 2010

(87) PCT Pub. No.: WO2009/010105
PCT Pub. Date: Jan. 22, 2009

(65) Prior Publication Data
US 2011/0148190 A1    Jun. 23, 2011

(30) Foreign Application Priority Data

Jul. 13, 2007   (DE) .......................... 10 2007 033 103

(51) Int. Cl.
*H02H 3/18*   (2006.01)
*B60L 3/00*   (2006.01)
*H02J 7/00*   (2006.01)
*H02J 1/00*   (2006.01)

(52) U.S. Cl.
CPC ............. *H02J 7/0045* (2013.01); *B60L 3/0069* (2013.01); *H02J 2001/006* (2013.01)
USPC .......................................................... 361/84

(58) Field of Classification Search
USPC .......................................................... 361/84
See application file for complete search history.

(56) References Cited

U.S. PATENT DOCUMENTS 3,313,995 A * 4/1967 Bach et al. ..................... 320/165
3,783,347 A * 1/1974 Vladik ........................... 257/717
(Continued)

FOREIGN PATENT DOCUMENTS

| DE | 10019588 A1 | 10/2001 |
| DE | 10118051 A1 | 11/2002 |
| EP | 1148610 A2 | 10/2001 |

(Continued)

OTHER PUBLICATIONS

European Patent Office, International Search Report, PCT/EP2007/061201, May 29, 2008.

*Primary Examiner* — Rexford Barnie
*Assistant Examiner* — Ann Hoang
(74) *Attorney, Agent, or Firm* — Sunstein Kann Murphy & Timbers LLP

(57) ABSTRACT

A polarity reversal protection device for motor vehicles has a detection device (10), a first connection element (22) electrically connected to a supply tap (94), a second connection device (24) having the electrical potential of the vehicle body. In case of a polarity reversal, the first connection element (22) is electrically connected to the first connection element (24) via the detector device (10). Further, the reverse polarity protection device is characterized in that a insulating layer (26) is provided between the first connection element (22) and the second connection element (24), that each of the connection elements (22, 24) has at least one receptacle (36, 38) and that the detection device (10) is at least positively engaged in at least one receptacle (36, 38).

18 Claims, 3 Drawing Sheets

(56) References Cited

U.S. PATENT DOCUMENTS

| | | | | |
|---|---|---|---|---|
| 3,818,584 | A * | 6/1974 | Suenaga et al. | 438/107 |
| 4,270,138 | A * | 5/1981 | Desmond | 257/796 |
| 7,042,744 | B2 * | 5/2006 | Courtney et al. | 363/141 |
| 2002/0024784 | A1 * | 2/2002 | Pinto de Oliveira | 361/91.6 |
| 2006/0071631 | A1 * | 4/2006 | Cheung et al. | 320/105 |

FOREIGN PATENT DOCUMENTS

| | | |
|---|---|---|
| WO | 2005/011079 | 2/2005 |
| WO | WO 2005/011079 | 2/2005 |

* cited by examiner

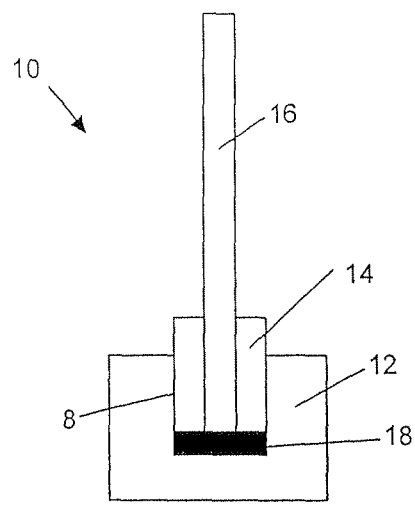
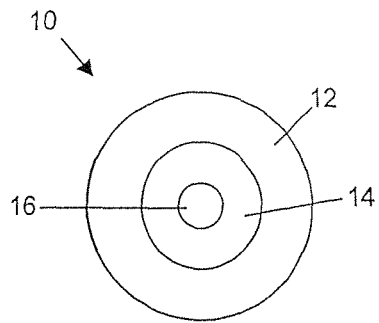
Fig.1a  Fig.1b
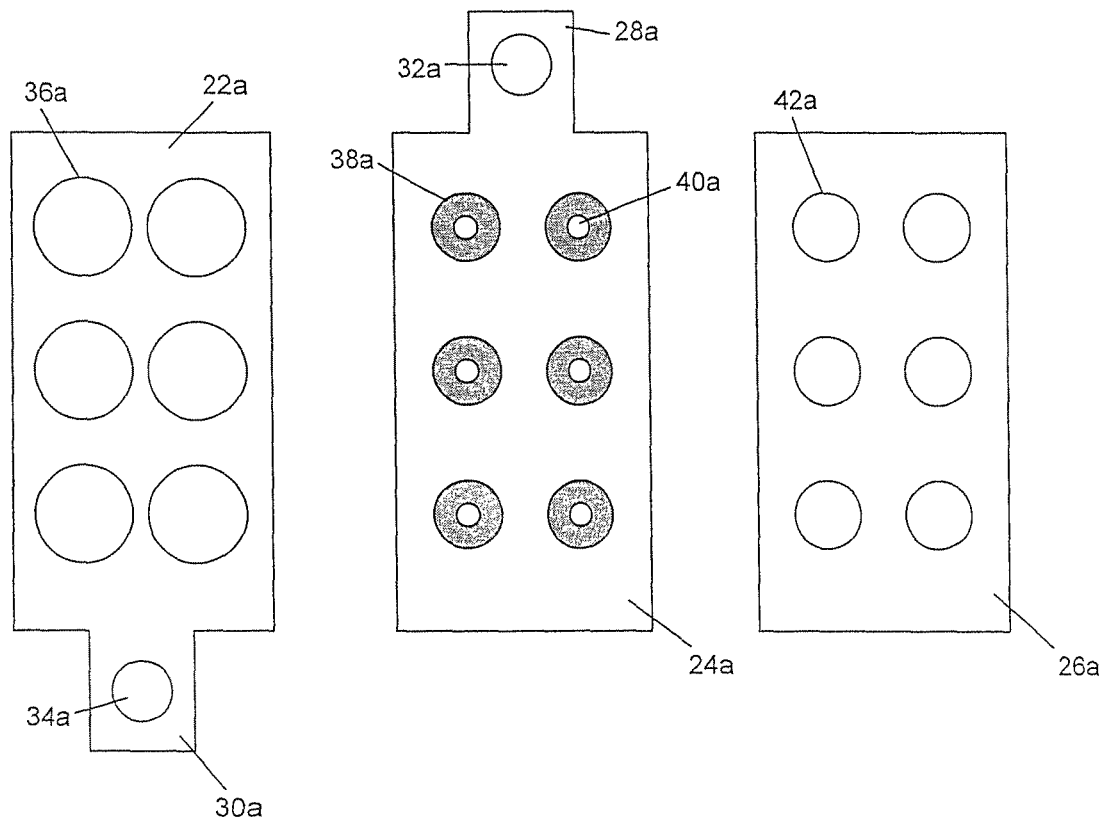
Fig.2

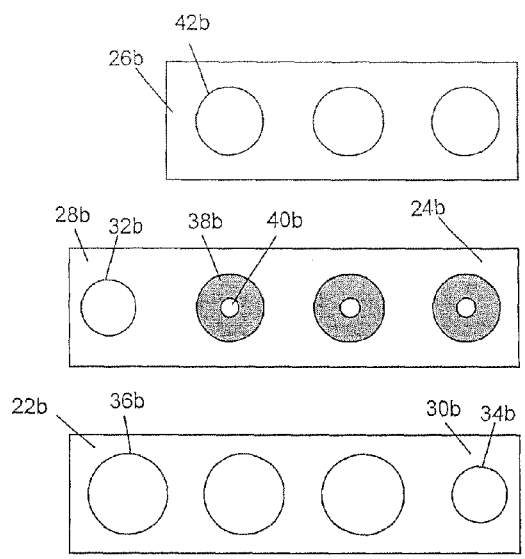
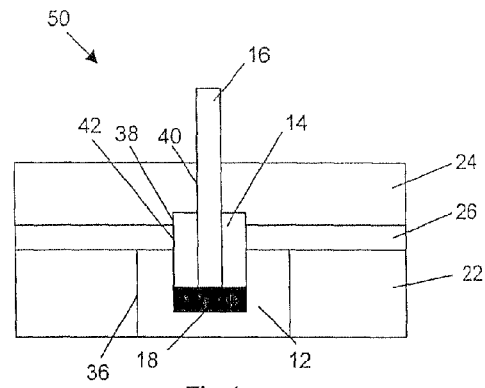
Fig.3
Fig.4
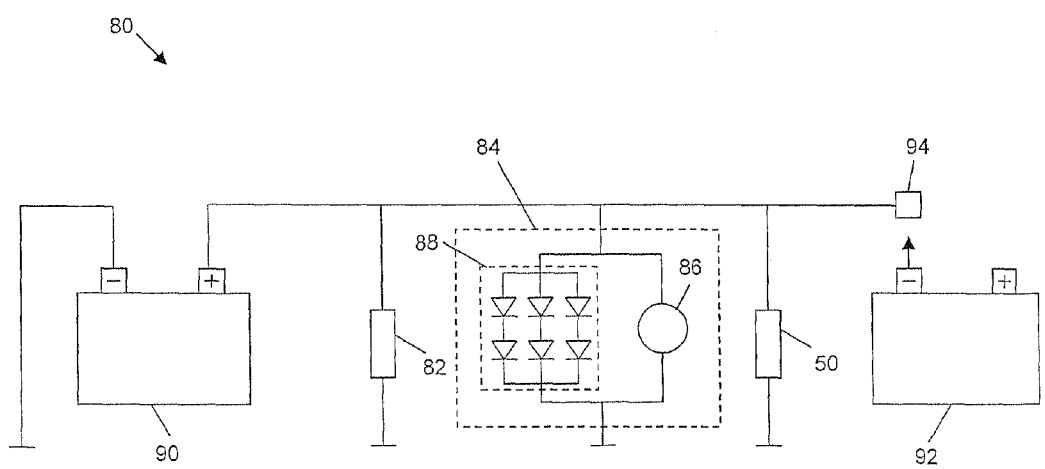
Fig.5

POLARITY REVERSAL PROTECTION UNIT FOR VEHICLE ELECTRIC SYSTEMS OF MOTOR VEHICLES

The application generally relates to a polarity reversal protection device for motor vehicles with a detector device, a first connection element electrically connected to a supply tap, a second connection element which has the electrical potential of the vehicle frame, wherein in the case of a polarity reversal, the first connection element is electrically connected to the second connection element via the detector device. Moreover, the application relates to a supply support tap having such a polarity reversal protection device as well as to a method for protecting a vehicle electrical system from polarity reversal.

In modern times, the vehicle electrical systems of motor vehicles are continuously increasing in size and comprise a high number of different consumers. The consumers are generally supplied with power from a vehicle battery. Many of these consumers are sensitive to polarity reversal. Examples of this are semiconductor switches or electrolytic capacitors which in the case of an incorrect polarity of a connected supply battery may get damaged or destroyed. In particular, substantial damage may be caused as a result of electrolytic capacitors due to an incorrect polarity, since electrolytic capacitors can explode and as a result of such an explosion, further components in the vicinity thereof may get damaged. Also, any transistor circuits can easily get destroyed as a result of a polarity reversal.

Further, damages to consumers of an a vehicle electrical system may be caused by an overvoltage. For some consumers, certain maximum admissible voltage limits exist. Higher voltages could destroy the consumers.

In particular, a polarity reversal may occur in the case of a jump start. If the wrong pole of the jump start battery or a jump start battery having an excessively high voltage is connected to a jump start unit, for example in the case of jump starting a passenger car using an HGV, considerable damages to the vehicle electrical system may be caused. The consequences will be a breakdown of the vehicle and high repair costs.

To protect against polarity reversal, centralised polarity reversal protection circuits may be used. Such polarity reversal protection circuits are known from the prior art. For example, DE 101 11 25 A1 discloses a polarity reversal protection circuit having a pyrotechnical separation element. In the case of a polarity reversal, the pyrotechnical separation element is ignited and the vehicle electrical system is separated from the battery. However, this polarity reversal protection circuit has the disadvantage that several components, such as for example the separation element or the detector device, will be destroyed.

One possibility of avoiding the destruction of components and the costly repair associated therewith is to use the B6 rectifier diode circuit of the generator provided in the vehicle. From the laid-open publication DE 100 19 588 A1, a jump start device is known, wherein by means of the diodes present in the generator the current flowing as a result of the polarity reversal is dissipated. Thus, a destruction of components of the vehicle electrical system and the polarity reversal protection device is avoided.

The diodes of the generator, however, are generally not designed for high currents, particularly not for a high continuous current. Such a current generates substantial thermal heat in the diodes. In the case of a continuous current, this thermal heat in the diode circuit of the generator can not be dissipated fast enough. This may cause the diodes to be destroyed, the current path is interrupted and the vehicle electrical system is no longer protected. Moreover, it is desirable to be able to use smaller sized diodes in the generator.

Further, at least two different batteries are used in hybrid vehicles, wherein a high-voltage battery supplies high voltages (e.g. above 100 V up to 1 kV) for the electric drive, whereas a low-voltage battery supplies a lower voltage (e.g. 12 V, 24 V, 48 V) to the vehicle electrical system. Generally, the generator is located between the internal combustion engine and the high-voltage battery and can charge the latter. The vehicle electrical system battery is connected to the generator via an inverter and a DC voltage converter. The jump start unit, however, is directly connected to the vehicle electrical system battery. As a result, the rectifier circuit of the generator in hybrid vehicles is no longer available for reverse polarity protection.

Therefore, the application is based on the technical object of providing a polarity reversal protection device for protecting consumers, which ensures a high level of protection for the consumer in the case of a polarity reversal and at the same time, a complex and costly production is avoided and the need for repairs is eliminated.

These and other objects are solved according to the application by means of a polarity reversal protection device for motor vehicles. This reverse polarity protection device comprises a detector device, a first connection element electrically connected to a supply unit and a second connection element having the electrical potential of the vehicle frame. In the case of a polarity reversal, the first connection element is electrically connected to the second connection element via the detector device. Further, an insulating layer is arranged between the first and second connection elements. Moreover, each of the connection elements has at least one receptacle. Here, the detector device is at arranged in positive engagement (interlocked, form-locked form-fit) in at least one receptacle.

Generally, the negative pole of a vehicle battery is connected to the vehicle frame. The vehicle electrical system is located between the positive potential of the battery and the potential of the vehicle body. In addition, a generator may be connected to the battery, so that the battery may be charged while driving. In the case of a hybrid vehicle, however, a generator is not directly connected to the vehicle electrical system battery. Moreover, an easily accessible supply tap for a jump start or an external charging operation is generally located in the engine compartment and is connected to the positive pole of the battery.

The polarity reversal protection device may be positioned between the supply tap, for example a jump start tap, and the vehicle frame. For example, the polarity reversal protection device may be connected directly to the vehicle frame or may be connected to the vehicle frame body via a conduit cable. Also, the polarity reversal protection device may be integrally formed with the battery terminal. Thus, it may be located in or adjacent to the pole gap of the battery terminal.

In the polarity reversal protection device, a direct electrical contact between the two connection elements is prevented by means of an insulating layer located between the connection elements. For example, an insulating film may be provided. It may be glued onto one of the connection elements. An electrical connection between the connection elements is provided via the detector device, wherein in the case of a correct polarity, the current path via the detector device is blocked.

However, in case of a polarity reversal, if a wrong pole or an excessively high voltage is connected at the supply tap, a current flows from the first connection element via the detector device to a second connection element. A current path across the polarity reversal protection device is established. In this case, the detector device short-circuits the supply tap with the negative potential of the battery. Thus, no voltage or just a low voltage (e.g. <1 V) will be present at the vehicle electrical system and a destruction of the vehicle electrical system will be avoided.

This current path must exist for a sufficiently long time, in order to ensure a secure reverse polarity protection. However, a current through the detector device generates high thermal heat, which may cause the destruction of the polarity reversal protection unit, in particular of the detector device, within a very short period of time, for example within less than one second. It has been recognised that a rapid dissipation of the heat will prevent a thermal destruction of the detector device for a sufficiently long time. It has also been recognised that a rapid dissipation of heat is achieved if the two connection elements have at least one receptacle for receiving the detector device. In addition, by means of an at least positive engagement of the detector device in at least one receptacle, a very good heat dissipation from the detector device via the connection elements to the outside will be achieved. For example, the detector device is at least positively engaged in the receptacles of both connection elements.

According to the polarity reversal protection device according to the present application, a pyrotechnical switch is not needed. Thus, high costs as a result of a repair of the pyrotechnical switch and any further components destroyed as a result of a polarity reversal will be avoided. Nevertheless, a more than adequate protection of the consumers of the vehicle electrical system will be ensured, whilst manufacturing costs are kept low and the polarity reversal protection device is easy to install.

According to one exemplary embodiment, at least one connection element may be made from a material having a high thermal conductivity. Materials having a high thermal conductivity are particularly capable of dissipating heat. In particular metals, for example copper or silver, have a high thermal conductivity. Advantageously, at least one connection element has a thermal conductivity of at least 235 W/(m*K), preferably over 400 W/(m*K). For example, copper plates may be used as connection elements, with both plates preferably having an equivalent or identical shape.

In addition, the thermal conductivity is a function of, amongst other things, the size of the contact area of the detector device with the connection elements. The connection elements may have at least one opening, for example with a diameter of 12.5 mm and a depth of 4 mm, as a receptacle. This is accompanied by large lateral areas of the openings for a good thermal dissipation due to the at least positive engagement. In addition, the first connection element may be thicker than the second connection element, in order to account for the greater thermal heating which occurs in this element.

Further, the detector device may be formed in such a way that it carries a current of at least 650 A for a minimum of 2 seconds. This limit value has been proven in tests to be sufficient for a secure protection of the consumers. However, requirements where a current of more than 650 A flows for more than 2.5 seconds may be safely met by using a polarity reversal protection device of a different size.

According to one exemplary embodiment, the detector device includes at least one diode. The use of other semiconductor elements, for example of transistors, would also be possible. Diodes may be operated both in the reverse and in the forward directions. A flow of current is possible only if a potential which is positive relative to the potential of the cathode is present on the anode of the diode. During normal driving or charging operation of the vehicle, the cathode is connected to the positive pole of the vehicle battery, whilst the anode has the potential of the vehicle frame. As a result, the current path via the polarity reversal protection device is blocked. In the case of a polarity reversal, however, a potential which is negative relative to the anode potential will be present on the cathode. The diode becomes conducting and the current induced as a result of the polarity reversal can flow directly over the reverse polarity protection device. A secure protection of the consumers is achieved since the voltage drop across the diode in the flow direction is generally 0.6 to 0.8 V. This potential is not harmful to the vehicle electrical system.

In case more than one diode, i.e. at least two, is used for the detector device, the diodes may be connected in parallel to each other. A current will then be divided between the then at least two diodes. This will result in a low current load on each individual diode.

According to an exemplary embodiment, three diodes are used in the detector device. Tests have shown that adequate safety of the consumers will be ensured when three diodes are used. However, it is also possible to use more or less diodes in the polarity reversal protection device. According to one embodiment, the reverse polarity protection device includes six diodes. As a result, the diodes may be selected to be smaller and higher currents or longer periods of time for an admissible current flow may be ensured.

According to a further embodiment, a power Zener diode may be used as the diode. Power Zener diodes have the advantage that they do not just provide secure protection against a polarity reversal of the poles, but at the same time provide secure protection against any excessively high voltages present. From a certain voltage, the so-called breakdown voltage, onwards a Zener diode will become conducting also in the reverse direction. For example, power Zener diodes having a breakdown voltage of more than or equal to 28 V may be used. In particular, this would provide protection against excessively high voltages from a connected HGV battery which may have a voltage of 24 V. In addition, the breakdown voltage may be a function of the sensitivity of the consumers installed in the on-board network to overvoltages.

The detector device may include a base element, a central element and a head element. It is also possible to have just a base element and a head element. Each of the three or two elements may have the shape of a cylinder. The elements may also have the shape of a parallelepiped, a cone or any other shape. In addition, the central element may have a smaller diameter than the base element and may be located above the same. The head element in its turn may protrude with a smaller diameter above the central element. The detector device, for example a power Zener diode, may therefore have the shape of a cylinder with a setback.

The base element may be made from an electrically conductive material, in particular from a material having a high thermal conductivity of at least 235 W/(m*K). The base element may preferably be made from copper. Apart from low self-heating, this ensures a good dissipation of the heat generated by the diodes to the connection element, so that a secure protection for the consumers is provided.

Further, the base element according to the present application may have a receptacle. The receptacle may have the shape of a pot.

In a further exemplary embodiment, a semiconductor element is disposed in the receptacle. The semiconductor element, for example an element made of silicon, may here preferably be disposed directly on the base element, preferably at the bottom of the receptacle. It is also possible to use other semiconductor elements or to position it at a different location of the receptacle. The semiconductor element has at least one semiconductor junction. The direct positioning of the semiconductor element on the base element having a high conductivity leads to an optimum heat dissipation of the heat generated by the current flow in the semiconductor element.

For the same reason, the head element of the detector device, which is also made from an electrically conductive material having a good thermal conductivity, may be directly attached to the semiconductor element. This head element, too, may be made from copper. The head element has a smaller diameter than the receptacle of the base element. A direct electric contact between the head and the base elements through the annular space is not possible. The annular space may be insulated.

In order to ensure a secure insulation between the base and head elements, a central element may be provided. The central element may be formed from an electrically non-conductive material. However, this element, too, may advantageously have a high thermal conductivity. For example, it may be introduced into the annular space by way of injection. Further, the central element may have a collar projecting beyond the edge of the receptacle of the base element. However, such a collar may also be omitted.

According to a further embodiment, the first connection element may have at least one opening for receiving the base element of the detector device. The shape of the opening corresponds to the shape of the base element. The shape may be circular, for example. The opening may be produced having a precise fit with little effort, for example by punching, milling or drilling. If punching is used, for example, the entire connection element including the openings and its form factor may be produced in one processing step. The depth of the connection element may correspond to the height of the base element. If for example more than one diode is used for the detector device, the connection element will have openings corresponding thereto.

The detector device may be disposed in the receptacle in positive engagement and/or in a force fit. For example, the detector device may be pressed into the receptacle. Other types of connection are possible. This so-called press fit ensures a positive engagement and a force-fit (frictional connection) of the base element with the connection element. This connection provides an optimum thermal connection of the detector device with the connection element and thus for an optimum thermal dissipation of the heat generated during a current flow.

Due to the fact that the semiconductor element is directly connected to the base element and the base element in its turn, due to the press fit, is in force-fit and positively engaged with the connection element, the thermal heat may be dissipated in an optimum manner. This ensures a superb thermal connection from the semiconductor element to the outside.

The second connection element has at least one receptacle corresponding to the shape of the central element, and at least one opening which corresponds to the shape of the head element and is located in the receptacle. The receptacle may have the form of a pot, the depth of which is low by comparison to the depth of the opening and may correspond to the height of the central element. The head element may have an extensive connection to the second connection element. A good thermal dissipation is given.

Further, as mentioned above, the insulating layer may be glued onto the second connection element, but equally onto the first connection element. The two connection elements are then assembled. An at least positive engagement is obtained. The connection may be achieved for example by adhesive glueing. Any excessively long head elements may be shortened or bent over and then soldered or welded onto the second connection element in order to achieve an at least material-fit connection.

In particular by means of the so-called reflow soldering, a superb thermal connection between the head and the second connection elements may be produced. To this end, solder paste is applied to the shortened ends of the head elements. The entire work piece is then heated in an oven, so that the solder paste liquefies. The liquid solder paste moves into the space between the head and the connection elements. Once the work piece has cooled down, an optimum positive engagement, form- and material-fit connection between the head element and the connection element is obtained, so that a good thermal connection exists. It is to be added that the melting point of the solder paste is higher than the thermal heating caused by a current flow, so that the semiconductor component in the detector device will not be destroyed during soldering. Moreover, a cost-effective manufacturing is possible.

According to a further exemplary embodiment, the connection elements have connection pieces. These provide a simple connection possibility for example with connection elements or with the vehicle frame. For example, leads may be riveted with the connection pieces in a simple manner. The connection piece and the connection element may be integrally formed. The connection pieces may also have cable lugs or connection pins.

The polarity reversal protection device according to the present application may be accommodated in a watertight housing in the engine compartment. This housing may for example be formed in the shape of a box. A watertight housing may be produced in a simple and cost-effective manner for example by overmoulding the polarity reversal protection device.

A further aspect of the application is a jump start unit comprising the polarity reversal protection device according to the present application. By integrating the polarity reversal protection device into the jump start unit, the design may be made small and compact.

According to a further exemplary embodiment, the jump start unit has a positive connection terminal, a negative connection terminal and an energy storage connection. By means of this compact design it becomes possible to connect, for a jump start, the negative terminal of the jump start lead to the negative connection terminal of the jump start unit. A troublesome searching for an connection point of the negative terminal of the jump start lead in the engine compartment will be eliminated. Moreover, the compact device is very easy to install.

A further aspect of the application is a method for protecting the vehicle electrical system against polarity reversal, in particular by means of a reverse polarity protection device according to the present application. In this method, a first electrical connection element is connected to a supply tap and a second connection element is electrically connected to the potential of the vehicle frame. In the case of a polarity reversal, a current flows from the first connection element via a detector device to the second connection element. Further, an insulating layer is provided between the connection elements. In addition, a detector device is at least positively engaged in at least one receptacle of the connection elements.

Independently from the embodiments described herein, the application is characterised in that it allows a continuous current to flow through the detector device in the case of a polarity reversal. The continuous current will not destroy the detector device for a sufficient length of time. During normal driving operation of the vehicle, however, a current flow through the detector device is prevented. This is equally the case during a correct charging operation.

The generator of a motor vehicle is omitted in particular in the case of a hybrid or an electric drive. As a result, any rectifier diode circuits, for example B6 or B12, which conventionally provide a polarity reversal protection, are absent. As a result, however, separate polarity reversal protection devices become necessary, in order to ensure a secure protection of the consumers from polarity reversal in a motor vehicle.

The application will be explained in more detail below by means of drawings showing exemplary embodiments, wherein:

FIG. 1a shows a schematic section view of a first exemplary embodiment of a detector device;

FIG. 1b shows a schematic top view of the first exemplary embodiment of the detector device;

FIG. 2 shows a schematic view of a first exemplary embodiment of the connection elements and of the insulating layer;

FIG. 3 shows a schematic view of a second exemplary embodiment of the connection elements and the insulating layer;

FIG. 4 shows a schematic section view of a first exemplary embodiment of a reverse polarity protection device;

FIG. 5 shows a circuit arrangement of a reverse polarity protection device;

Wherever possible, like elements were given the same reference numerals in the drawings.

Figure 6:
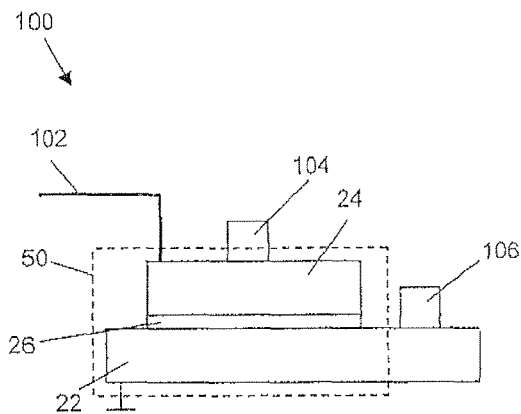
FIG. 6 shows a simplified lateral view of a first exemplary embodiment of a jump start unit having an integrated reverse polarity protection device.

FIG. 1a shows a simplified sectional view of a first exemplary embodiment of a detector device 10, for example a power Zener diode, which will simply be referred to below as a diode. The detector device 10 includes a base element 12 having a receptacle 8. The receptacle 8 has the shape of a pot, but other shapes are also conceivable. At the bottom of the pot, a semiconductor element 18 is arranged. As is evident from FIG. 1, the semiconductor element 18 is directly connected to the base element 12. The semiconductor element 18 may be made from silicon. It may have a pn junction as the barrier layer. The base element 12 may be formed from a non-ferrous metal, preferably from copper or another non-ferrous metal. However, other materials may also be used for these elements 12, 18.

Again directly attached to the semiconductor element 18 is a head element 16 which is made from an electrically conductive material. The head element 16 is electrically connected to the base element 12 exclusively via the semiconductor element 18. For insulation, a central element 14 made of an electrically non-conductive material is provided between the head 16 and the base 12 elements. The external shape shown in FIG. 1 is stepped.

In FIG. 1b, a schematic top view of the detector device 10 is shown. It can be seen that both the base element 12 and the central element 14 and the head element 16 have a circular shape. Whilst other shapes are also conceivable, however, the illustrated shape of the detector device 10 is particularly suitable for installing the detector device 10 in the polarity reversal protection device 50.

FIG. 2 shows a schematic view of a first exemplary embodiment of a first connection element 22a, a second connection element 24a and an insulating layer 26a. All of the three elements 22a, 24a, 26a have the same rectangular basic shape. Other shapes of the three elements 22a, 24a, 26a are also conceivable. The first connection element 22a and the second connection element 24a additionally have a connection piece 30a, 28a having a round opening 34a, 32a, respectively, for accommodating connection leads (not shown). Other connection pieces are possible.

The embodiment illustrated is used for receiving a detector device 10 which comprises for example six diodes 10. This becomes obvious due to the respectively six bores 36a, 40a, 42a, each for receiving a diode 10. Other receptacles 36a, 40a, 42a are also conceivable. The bores 36a of the first connection element 22a correspond to the shape of the base elements 12. The same applies to the bores 40a of the second connection element 24a and the head elements 16. In addition, the second connection element 24a has receptacles 38a corresponding to the shape of the central elements 14. The diameter of the bores 42a of the insulating film 26a corresponds to the diameter of the receptacles 38a. The bores 36a may be blind holes. The receptacles 38a may also be blind holes. The bores 42a and 40a are through-holes.

FIG. 3 shows a schematic view of a second embodiment of the first connection element 22b, the second connection element 24b and the insulating layer 26b. The essential difference between the embodiment according to FIG. 3 and the example shown in FIG. 2 is that a detector device 10 having just three diodes 10 is used. This enables a significant miniaturisation to be achieved.

FIG. 4 shows a simplified schematic sectional view of a polarity reversal protection device 50. For the sake of improving the illustration, only one detector device 10 is shown in the reverse polarity protection device 50. For the same reason, no connection pieces 28, 30 are shown.

Above the first connection element 22, an insulating film 26 attached as an insulating layer 26 is disposed, and on top of that, the second connection element 24 is disposed. Further illustrated are the bore 36 of the first connection element 22 and the receptacle 38 as well as the bore 40 of the second connection element 24. Also shown is the opening 42 of the insulating film 26. Further shown is the detector device 10 having the base element 12, the semiconductor element 18, the central element 14 and the head element 16. The detector device 10 is at least positively engaged with the two connection elements 22, 24 and the insulating layer 26. As shown in FIG. 4, the first connection element 22 may be thicker than the second connection element 24, in order to effect an optimum dissipation of the thermal heat from the base element 12 through a large connection surface of the base element 12 with the connection element 22.

The design of the polarity reversal protection device 50 according to FIGS. 1a to 4 will be explained in more detail below.

Initially, the two connection elements 22, 24 are produced. Preferably, the connection elements 22, 24 are produced integrally with the connection pieces 28, 30. The openings 36, 40, or the receptacle 38, may be produced to correspond to the shape of the detector device 10.

In the next step, the base element 12 is introduced into the bore 36 of the first connection element 22. In order to achieve an optimum thermal flow from the base element 12 to the connection element 22, a press-fit connection may be made, for example. To this end, the base element 12 is pressed into the bore 36, so that a positive engagement or form-fit connection is obtained.

At the same time, the insulating film 26 may be applied to the second connection element 24. This may for example be accomplished by adhesive glueing or spraying on.

After that, the above produced components are assembled to a module. This may also be accomplished by means of adhesively glueing the insulation layer 26 to the first connection element 22. The projecting portion of the head element 16 may subsequently be shortened or bent over.

What is not shown in FIG. 4 is that initially, a small space remains between the head element 16 and the second connection element 24. A positive engagement has so far not been created. For this reason, the head element 16 can not be soldered or welded onto the second connection element 24 yet.

Reflow soldering in particular ensures a complete and material-fit with optimum thermal conductivity. Initially, solder paste is applied onto the head elements 16. Then, the work piece is heated in an oven. Generally, a plurality of work pieces may be heated in the oven at the same time. The liquid solder paste moves into the space between the head element 16 and the second connection element 24. As a result of a subsequent cooling down of the polarity reversal protection device 50, the solder paste solidifies and provides a material-fit and concomitant therewith an optimum thermal connection between the head element 16 and the connection element 24.

In a next step, the polarity reversal protection device 50 may be overmoulded to be watertight or may be positioned in a watertight housing. Subsequently, connection leads (not shown) may be attached to the connection pieces 28, 30, for example by riveting.

The structure thus produced is compact and small and in addition ensures superb heat dissipation.

FIG. 5 shows a simplified circuit arrangement 80 of a motor vehicle without an electric drive. In the case of a vehicle with an electric drive, the essential difference for the polarity reversal protection would be that the generator 84 would not be disposed directly at the battery 90 of the vehicle electrical system. Further components would be present, such as for example a high-voltage battery or a DC voltage converter. For the sake of clarity, such an illustration was omitted.

The circuit arrangement 80 shows a vehicle battery 90, the negative pole of which is connected to the vehicle frame, here illustrated by means of a ground connection.

Moreover, the positive pole of the battery 90 is connected to an vehicle electrical system 82, the polarity reversal protection device 50 according to the application and a supply tap 94 such as for example a jump start tap 94. A generator 84 may be connected in parallel to the vehicle electrical system 82 and the polarity reversal protection device 50. The generator 84 includes, amongst other things, a BE rectifier diode circuit 88 (indicated) and a starter motor 86. In the case of drives such as an electric or a hybrid drive, however, this generator 84 is positioned between other components. Finally, a jump start battery 92 is shown, and the drawing indicates a polarity reversal.

In the jump start tap 100 shown in FIG. 6, the polarity reversal protection device 50 according to the application is integrated. What is not shown in FIG. 6 for the sake of clarity is the detector device 10. The polarity reversal device 50 comprises the known components of first and second connection elements 22, 24 as well as the insulating foil 26. Whilst the second connection element 24 is connected to the vehicle frame, illustrated by means of the ground connection, the first connection element 22 has an energy storage connection 102.

Apart from that, two connection terminals 104, 106 for a simple connection of a jump lead are present, a positive connection terminal 104 and a negative connection terminal 106. This jump start unit 100 with the integrated polarity reversal protection device 50 ensures a simple installation and provides a facilitated aid for a jump start.

Figure 7:
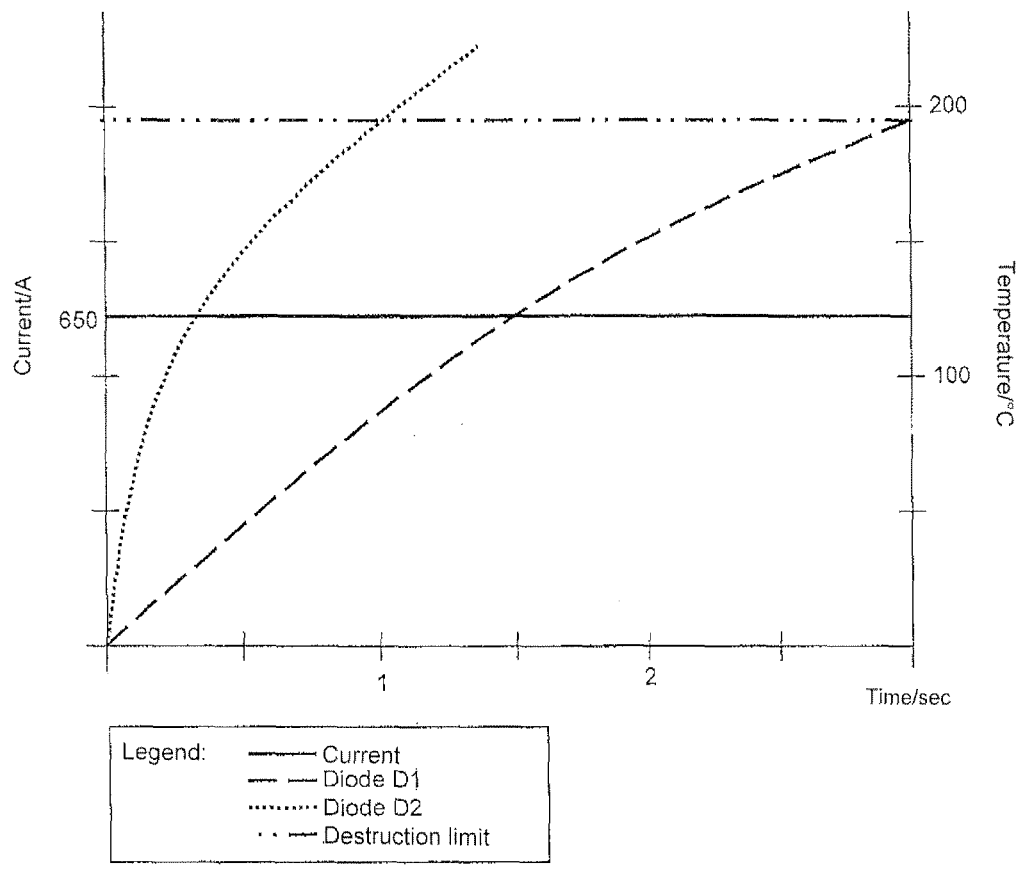
FIG. 7 shows a current, time and temperature graph. The drawings show a particularly cost-effective design of the polarity reversal protection device according to the present application, which ensures a more than adequate protection for the consumers of an on-board network.

Finally, FIG. 7 shows exemplary test graphs from a diode D1 without a polarity reversal protection device 50 according to the application and from a diode D2 of the same design with a polarity reversal protection device 50 according to the application. What is illustrated are the temperature/time characteristics of the two diodes D1, D2 for a current of 650 A. It can be seen from FIG. 7 that the temperature of diode D1 increases at a substantially higher rate and the thermal destruction limit of the diode is reached much sooner than in the case of diode D2. The minimum requirement of being able to withstand a current of 650 A for a minimum of 2 seconds is readily met by diode D2. In this example, even a continuous current of 3 seconds is possible. The diode D1, however, reaches the destruction limit as early as after 1 second.

Finally, the functioning mode of the polarity reversal protection device 50 according to FIGS. 1a to 7 will be explained in more detail below:

In this example, a power Zener diode 10 will be used as the detector device 10. In case the jump start battery 92 has been correctly connected for a jump start or an extraneous charging process, the current path via the polarity reversal protection device 50 is blocked. Only a leakage current of between 20 and 100 μA for each diode 10 used can flow. During the driving operation, no current except the leakage current will flow via the polarity reversalprotection device 50 through the detector device 10 either.

If for example in the case of a polarity reversal, as indicated in FIG. 5, the negative pole of the jump start battery 92 is connected to the jump start tap 94, a negative potential compared to the potential of the vehicle body will be present on the jump start unit 94. In other words, the at least one diode 10 of the polarity reversal protection device 50 is operated in the forward direction. An induced current which, depending on the charge condition of the battery, may be 650 A or more, flows immediately via the polarity reversal protection device 50. Only a minor proportion will flow through the remaining components such as the vehicle electrical system 82 or a generator 84, if present. A secure protection of the connected on-board network 82 is ensured.

Finally, at this point the case where the correct pole of a jump start battery 92 is connected to the jump start tap 94, but the jump start battery 92 has an excessively high voltage which may cause damages to the vehicle electrical system 82, will be looked at briefly. This case occurs, for example, when the battery of a passenger vehicle, which generally has a voltage of 12 V, is charged using a HGV battery generally having 24 V. The detector device 10 has power Zener diodes 10, the breakdown voltage of which may be 20 V in this example. This means in this case that the power Zener diodes 10, since the voltage present is 24 V, will become conducting and the on-board network 82 will be securely protected.

By means of the structure of a polarity reversal protection device as described, the desired secure protection of consumers against polarity reversal or excessively high voltages is obtained, whilst at the same time manufacturing costs are kept low and any repair costs are eliminated. In addition, a compact design is ensured and no modification to any existing components is needed.

It is evident that the embodiments described are but a few out of a large number of possible embodiments. For example, for the sake of clarity only one power Zener diode is illustrated as the detector device in the illustrated exemplary embodiment. A detector device may also comprise several diodes, which may also at least partially be connected in series, or other semiconductor devices, as well as further components. Further, the illustrated detector device may have different designs.

The invention claimed is:

1. A polarity reversal protection device for a motor vehicle comprising:
   a detection device;
   a first connection element electrically connected to a supply tap;
   a second connection element having an electrical potential of the motor vehicle; and
   an insulating layer arranged between the first connection element and the second connection element, each of the connection elements having at least one receptacle with a sidewall;
   wherein the detection device has a semiconductor element, a base element and a head element, the base element being made from electrically conductive material and having a receptacle, the semiconductor element being directly arranged in the receptacle of the base element, the base element being directly connected to the semiconductor element, and the base element of the detection device being fit within at least one receptacle of the connection elements wherein the base element is flush against the sidewall of the at least one receptacle, and
   wherein in the case of a polarity reversal, the first connection element is electrically connected to the second connection element via the detection device.

2. The polarity reversal protection device of claim 1, wherein at least one connection element is made from a material having a high thermal conductivity.

3. The polarity reversal protection device of claim 1, wherein the detection device is formed in such a way that it carries a current of at least 650 A for a minimum of 2 seconds without being destroyed.

4. The polarity reversal protection device of claim 1, wherein the detection device has at least one diode.

5. The polarity reversal protection device of claim 4, wherein the detection device has at least two diodes connected in parallel to each other.

6. The polarity reversal protection device of claim 4, wherein the diode is a power Zener diode.

7. The polarity reversal protection device of claim 1, further comprising a central element positioned on the base element and surrounding the head element.

8. The polarity reversal protection device of claim 7, wherein the head element is electrically insulated from the base element by the central element.

9. The polarity reversal protection device of claim 7, wherein the first connection element has at least one opening for receiving the detection device.

10. The polarity reversal protection device of claim 7, wherein the second connection element has at least one receptacle corresponding to the shape of the central element of the detection device.

11. The polarity reversal protection device of claim 7, wherein the receptacle of the second connection element has at least one opening corresponding to the shape of the head element of the detection device.

12. The polarity reversal protection device of claim 7, wherein the insulating layer has at least one opening corresponding to the shape of the central element of the detection device.

13. The polarity reversal protection device of claim 7, wherein the head element of the detection device is soldered or welded to the second connection element.

14. The polarity reversal protection device of claim 1 wherein the base element is press-fit within the receptacle.

15. The polarity reversal protection device of claim 1, wherein the connection elements have connection pieces.

16. The polarity reversal protection device of claim 1, wherein a housing surrounds the polarity reversal protection device in a watertight manner.

17. The polarity reversal protection device of claim 1 wherein the supply tap has a positive connection terminal.

18. A method for protecting a vehicle electrical system of a motor vehicle against polarity reversal, comprising:
    electrically connecting a first electrical connection element to a supply tap; and
    electrically connecting a second connection element to a vehicle frame such that the second connection element has the potential of the vehicle frame, the second connection element being insulated from a direct connection with the first connection element via an insulating layer and wherein each of the connection elements has at least one receptacle with a sidewall;
    providing a detection device having a semiconductor element, a base element and a head element, the base element being made from electrically conductive material and having a receptacle, the semiconductor element being directly arranged in the receptacle of the base element, the base element being directly connected to the semiconductor element, and the base element of the detection device being fit within at least one receptacle of the connection elements wherein the base element is flush against the sidewall of the at least one receptacle, and
    wherein upon flowing of a reversed polarity current from the supply tap to first connection element, the detection device short-circuits the supply tap with the vehicle frame whereby the reversed polarity current flows from the first connection element to the second connection element via the detection device.

* * * * *